US007009492B1

(12) United States Patent
Ismailov

(10) Patent No.: US 7,009,492 B1
(45) Date of Patent: Mar. 7, 2006

(54) INDIVIDUAL QUANTITATIVE IDENTIFICATION BY MEANS OF HUMAN DYNAMIC RHYTHMIC ELECTRIC ACTIVITY SPECTRA

(75) Inventor: Murad M. Ismailov, Lansing, MI (US)

(73) Assignee: Combustion Dynamics Corp., New York, NY (US)

( * ) Notice: Subject to any disclaimer, the term of this patent is extended or adjusted under 35 U.S.C. 154(b) by 187 days.

(21) Appl. No.: 10/769,340

(22) Filed: Jan. 30, 2004

Related U.S. Application Data

(60) Provisional application No. 60/443,601, filed on Jan. 30, 2003.

(51) Int. Cl.
H04B 1/00 (2006.01)

(52) U.S. Cl. .................................... 340/5.82; 340/5.52

(58) Field of Classification Search .............. 340/5.82, 340/5.52; 382/115; 902/3; 702/71, 76, 702/79; 600/509, 512, 513, 523, 544, 546; 360/6; 708/404
See application file for complete search history.

(56) References Cited

U.S. PATENT DOCUMENTS

| | | | | |
|---|---|---|---|---|
| 3,934,267 A * | 1/1976 | Kosaka et al. .................. 360/6 |
| 4,006,737 A * | 2/1977 | Cherry ......................... 600/515 |
| 4,073,011 A * | 2/1978 | Cherry et al. ............. 360/73.01 |
| 4,090,505 A * | 5/1978 | Mortara ....................... 600/515 |
| 4,098,267 A * | 7/1978 | Stein et al. .................. 600/524 |
| 4,216,780 A * | 8/1980 | Rubel et al. ................. 600/512 |
| 4,308,873 A * | 1/1982 | Maynard ..................... 600/544 |
| 4,341,225 A * | 7/1982 | Gallant et al. .............. 600/523 |
| 4,421,121 A * | 12/1983 | Whisler et al. ............. 600/544 |
| 4,583,190 A * | 4/1986 | Salb ........................... 708/404 |
| 4,680,708 A * | 7/1987 | Ambos et al. .............. 600/509 |
| 4,736,307 A * | 4/1988 | Salb ........................... 600/544 |
| 4,924,875 A * | 5/1990 | Chamoun .................... 600/509 |
| 4,947,857 A * | 8/1990 | Albert et al. ................ 600/509 |
| 5,025,794 A * | 6/1991 | Albert et al. ................ 600/509 |
| 5,029,082 A * | 7/1991 | Shen et al. .................. 600/512 |
| 5,083,571 A * | 1/1992 | Prichep ....................... 600/544 |
| 5,092,341 A * | 3/1992 | Kelen .......................... 600/515 |
| 5,109,862 A * | 5/1992 | Kelen et al. ................. 600/515 |
| 5,117,833 A * | 6/1992 | Albert et al. ................ 600/515 |
| 5,241,967 A * | 9/1993 | Yasushi et al. ............. 600/545 |
| 5,813,993 A * | 9/1998 | Kaplan et al. .............. 600/544 |
| 6,223,073 B1 * | 4/2001 | Seegobin ..................... 600/515 |
| 6,549,804 B1 * | 4/2003 | Osorio et al. ............... 600/544 |
| 6,574,491 B1 * | 6/2003 | Elghazzawi ................. 600/323 |
| 6,574,573 B1 * | 6/2003 | Asano ......................... 702/76 |
| 6,678,547 B1 * | 1/2004 | Carlson et al. ............. 600/515 |

\* cited by examiner

*Primary Examiner*—Albert K. Wong
*Assistant Examiner*—William Bangachon
(74) *Attorney, Agent, or Firm*—Greenberg Traurig

(57) ABSTRACT

A system and method for individual quantitative identification by means of human dynamic rhythmic electric activity spectra is provided. The method for distinguishing an individual, comprising; contacting the individual with an electrical probe; measuring, with the electrical probe, an electrical signal associated with the individual; processing the electrical signal to produce a time-series representation of the electrical signal and a frequency-domain representation of the electrical signal; identifying a distinct pattern in the time-series representation in a range of about 30 kHz to about 50 kHz; and identifying a distinct pattern in the frequency-domain representation in a range of about 500 kHz to about 1.5 MHz.

1 Claim, 6 Drawing Sheets

Comparison of time series and spectra in high frequency domain for individuals "s" (top), "e" (middle) and "m" (bottom).

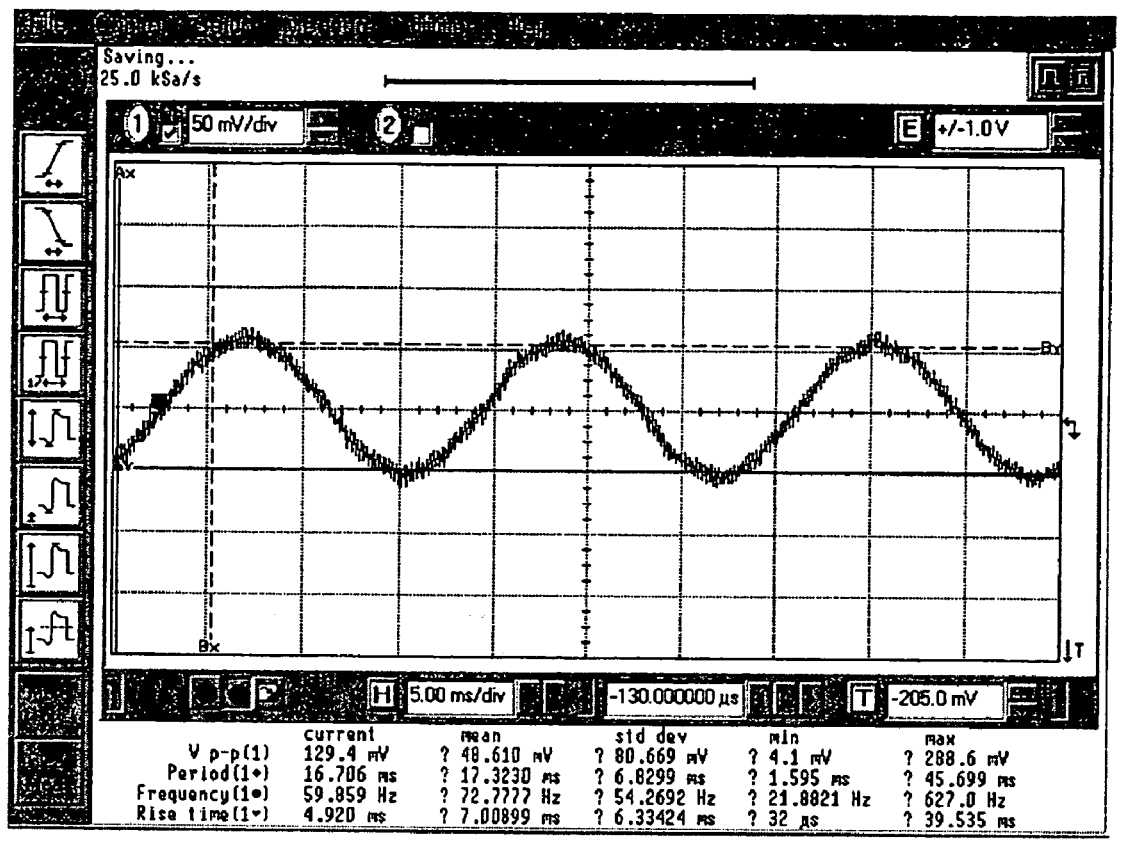
Fig. 1. Low frequency signal domain with a high frequency modulation.

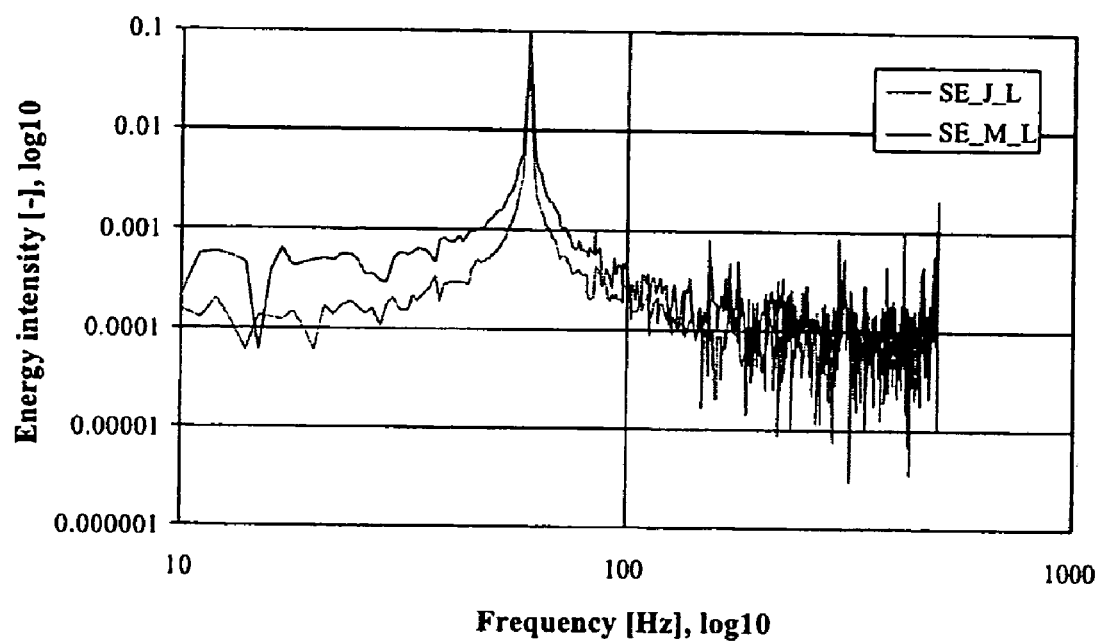
Fig.2. Spectra energy in low frequency domain.

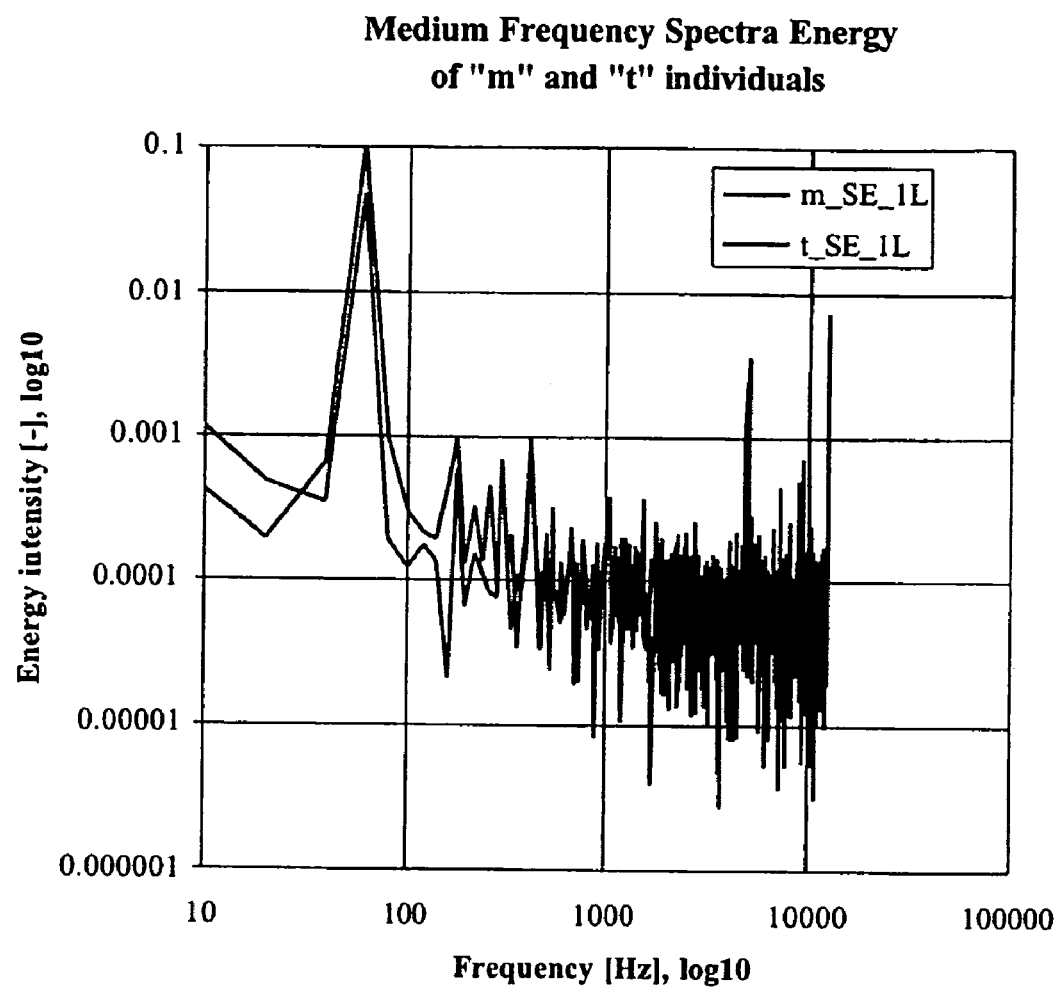
Fig. 3. Spectra energy in medium frequency

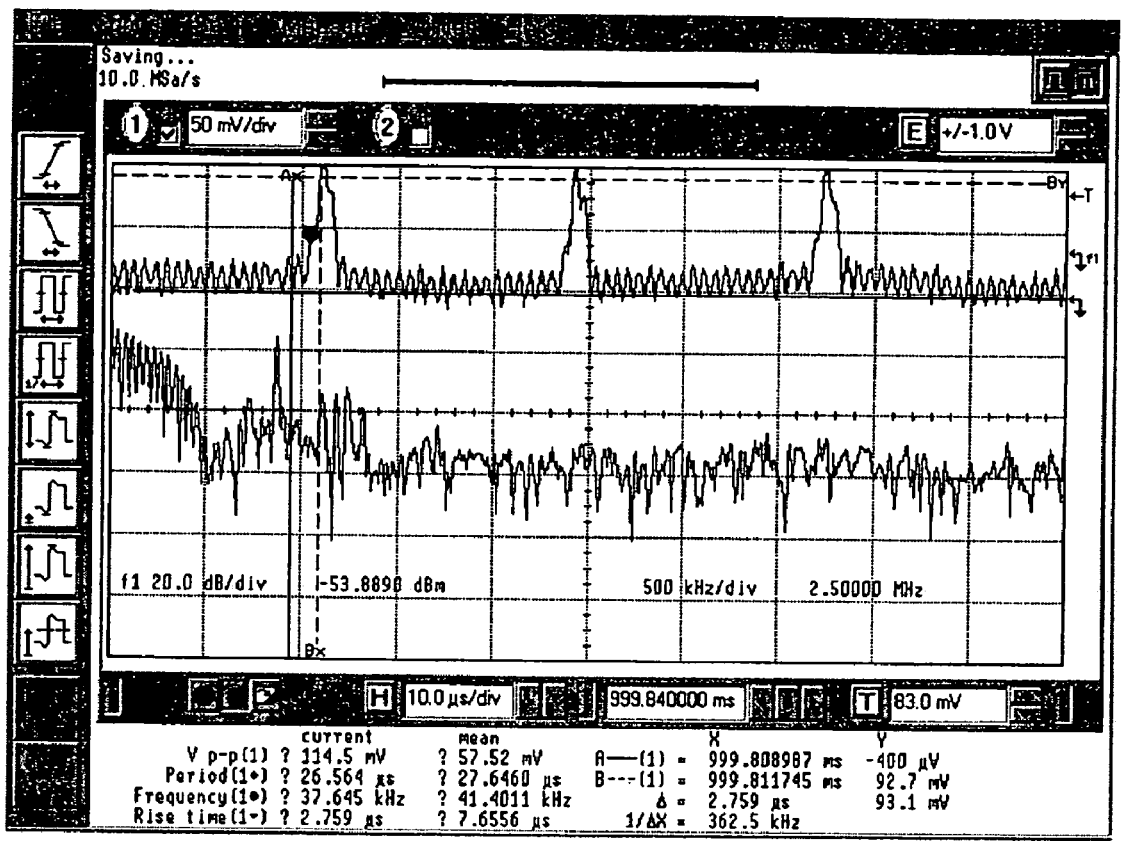
Fig. 4. Rhythmic time series and fast Fourier spectrum energy obtained on "m" individual.

Comparison of time series and spectra in high frequency domain for individuals "a" (top), "e" (middle) and "m" (bottom).

Differential Output: Right minus Left

Simultaneous measurements on right and left hands index fingers of "m" individual (top) and differential output for first two spikes (bottom).

INDIVIDUAL QUANTITATIVE IDENTIFICATION BY MEANS OF HUMAN DYNAMIC RHYTHMIC ELECTRIC ACTIVITY SPECTRA

CROSS-REFERENCE TO RELATED APPLICATIONS

This application claims the benefit under 35 U.S.C. 119(e) of U.S. Provisional Application Ser. No. 60/443,601, filed Jan. 30, 2003.

FIELD OF THE INVENTION

Various embodiments of the present invention are directed to methods and systems for individual quantitative identification by means of human dynamic rhythmic electric activity spectra.

More particularly, one embodiment of the present invention provides a method for distinguishing an individual, comprising: contacting the individual with an electrical probe; measuring, with the electrical probe, an electrical signal associated with the individual; processing the electrical signal to produce a time-series representation of the electrical signal and a frequency-domain representation of the electrical signal; identifying a distinct pattern in the time-series representation in a range of about 30 kHz to about 50 kHz; and identifying a distinct pattern in the frequency-domain representation in a range of about 500 kHz to about 1.5 MHz.

Detailed systems for performing the methods are also disclosed.

For the purposes of the present application the term "individual" is intended to refer to a particular, distinct, living human being.

Further, for the purposes of the present application the term "distinguishing an individual" is intended to refer to being designed to differentiate (via certain characteristic parameters) a particular, distinct, living human being with a high probability of correctness (but not necessarily to be capable of correctly differentiating every living human being from one another under all circumstances).

Of note, various embodiments of the present invention may hereinafter sometimes be referred to below as "Dynamic Rhythmic Electric Activity Spectra" or "DREAS".

BACKGROUND OF THE INVENTION

Two types of physiological rhythmic activity are conventionally studied and measurable. One type of physiological rhythmic activity is heart rate variability ("HRV"). HRV is believed to be based on the fluctuations of the activity in brain cardiovascular vasocontrictory and vasodilatory centers. Typically, these fluctuations are a result of blood pressure oscillation (baroreflex modulated), respiration (parasympathically mediated via thermoregulatory peripherical blood flow adjustment) and circardian biorhythm. All these factors can influence the length of beat-to-beat intervals, named cardiointervals or R—R intervals.

Of note, cardiointervals are typically measured from electrocardiogram ("ECG"), plethysmogram, or phonocardiogram, but predominantly an ECG is used. The frequency of such measurements is typically directly associated with cardiac impulse frequency of around 1 Hz.

In this regard, examples of patents relating to such ECG's include the following: U.S. Pat. No. 4,006,737 to Cherry (entitled "Electrocardiographic Computer"); U.S. Pat. No. 4,073,011 to Cherry et al. (entitled "Electrocardiographic Computer"); U.S. Pat. No. Re. 29,921 to Cherry et al. (entitled "Electrocardiographic Computer"); U.S. Pat. No. 4,090,505 to Mortara (entitled "Electrocardiographic Recording Method And Means"); U.S. Pat. No. 4,098,267 to Stein et al. (entitled "System For Display And Analysis Of Physiological Signals Such As Electrocardiographic (ECG) Signals"); U.S. Pat. No. 4,216,780 to Rubel et al. (entitled "Apparatus For The Acquisition And Pre-Processing Of Electrocardiographic Data"); and U.S. Pat. No. 4,341,225 to Gallant et al. (entitled "Electrocardiography System").

Moreover, examples of patents relating to numeric processing of ECG signals (i.e., by fast fourier transform ("FFT")) include the following: U.S. Pat. No. 4,680,708 to Ambos et al. (entitled "Method And Apparatus For Analyzing Electrocardiographic Signals"); U.S. Pat. No. 4,924,875 to Chamoun (entitled "Cardiac Biopotential Analysis System And Method"); U.S. Pat. No. 4,947,857 to Albert et al. (entitled "Method And Apparatus For Analyzing And Interpreting Electrocardiograms Using Spectro-Temporal Mapping"); U.S. Pat. No. 5,025,794 to Albert et al. (entitled "Method For Analysis Of Electrocardiographic Signal QRS Complex"); U.S. Pat. No. 5,029,082 to Shen et al. (entitled "Correlative Analysis In Multi-Domain Processing Of Cardiac Signals"); U.S. Pat. No. 5,117,833 to Albert et al. (entitled "Bi-Spectral Filtering Of Electrocardiogram Signals To Determine Selected QRS Potentials"); U.S. Pat. No. 6,223,073 to Seegobin (entitled "Noninvasive Method For Identifying Coronary Disfunction Utilizing Electrocardiography Derived Data"); and U.S. Pat. No. 6,678,547 to Carlson et al. (entitled "Cardiac Rhythm Management System Using Time-Domain Heart Rate Variability Indicia").

Another type of physiological rhythmic activity is the electric field of the human brain. The electric field of the human brain is typically measured by an electroencephalogram ("EEG"). Normally, the frequency spectrum includes a number of neuronal activation amplitudes defined as delta 0.5–3 Hz, theta 4–7 Hz, alpha 8–13 Hz, beta 14–30 Hz and gamma >30 Hz (within about 100 Hz).

By way of additional background, it is noted that the number of nerve cells in the brain has been estimated to be on the order of $10^{11}$ and that cortical neurons are strongly interconnected. Further, the electric behavior of the neuron corresponds to the description of excitable cells. It is believed that generally, the resting voltage is around −70 mV, and the peak of the action potential is positive. Moreover, it is believed that the amplitude of the nerve impulse is generally about 100 mV, and it lasts about 1 ms. Spontaneous activity is conventionally measured on the scalp or on the brain via EEG. Evoked potentials are those components of EEG that arise in response to a stimulus (which may be electric, auditory, visual, etc.). Such signals are typically below the noise level and thus not readily distinguished. Single-neuron behavior can conventionally be examined through the use of microelectrodes, which impale the cells of interest.

In any case, examples of patents relating to such EEG's include the following: U.S. Pat. No. 3,934,267 to Kosaka et al. (entitled "Vital Phenomenon Recording And/Or Reproducing Device"); U.S. Pat. No. 4,308,873 to Maynard (entitled "Electroencephalograph Monitoring"); U.S. Pat. No. 4,421,121 to Whisler et al. (entitled "Method And Apparatus For Obtaining A Non-Cephalic Referential Electroencephalograph"); and U.S. Pat. No. 5,241,967 to Yasushi et al. (entitled "System For Evoking Electroencephalogram Signals").

Moreover, examples of patents relating to numeric processing of EEG signals (i.e., by fast fourier transform ("FFT")) include the following: U.S. Pat. No. 4,583,190 to Salb (entitled "Microcomputer Based System For Performing Fast Fourier Transforms"); U.S. Pat. No. 4,736,307 to Salb (entitled "Microcomputer-Based System For The On-Line Analysis And Topographic Display Of Human Brain Electrical Activity"); U.S. Pat. No. 5,083,571 to Prichep (entitled "Use Of Brain Electrophysiological Quantitative Data To Classify And Subtype An Individual Into Diagnostic Categories By Discriminant And Cluster Analysis"); U.S. Pat. No. 5,092,341 to Kelen (entitled "Surface ECG Frequency Analysis System And Method Based Upon Spectral Turbulence Estimation"); U.S. Pat. No. 5,109,862 to Kelen et al. (entitled "Method And Apparatus For Spectral Analysis Of Electrocardiographic Signals"); U.S. Pat. No. 5,813,993 to Kaplan et al. (entitled "Alertness And Drowsiness Detection And Tracking System"); U.S. Pat. No. 6,549,804 to Osorio et al. (entitled "System For The Prediction, Rapid Detection, Warning, Prevention Or Control Of Changes In Activity States In The Brain Of A Subject"); U.S. Pat. No. 6,574,491 to Elghazzawi (entitled "Method And Apparatus For Detecting A Physiological Parameter"); and U.S. Pat. No. 6,574,573 to Asano (entitled "Spectrum Analysis And Display Method Time Series").

Nevertheless, the above-mentioned patents fail to disclose use of the time series/frequency-domain regions employed by the present invention (e.g., for distinguishing an individual).

BRIEF DESCRIPTION OF THE DRAWINGS

FIG. 1 shows a time series plot of a low frequency signal with a high frequency modulation according to an embodiment of the present invention;

FIG. 2 shows a frequency-domain plot (low frequency) of a spectra energy pattern obtained in connection with certain individuals (referred to here as "j" and "m" individuals) according to an embodiment of the present invention;

FIG. 3 shows a frequency-domain plot (medium frequency) of a spectra energy pattern obtained in connection with certain individuals (referred to here as "m" and "t" individuals) according to an embodiment of the present invention;

FIG. 4 shows a rhythmic time series and the FFT spectrum energy obtained on an individual (referred to here as "m" individual) according to an embodiment of the present invention;

Figure 5A:
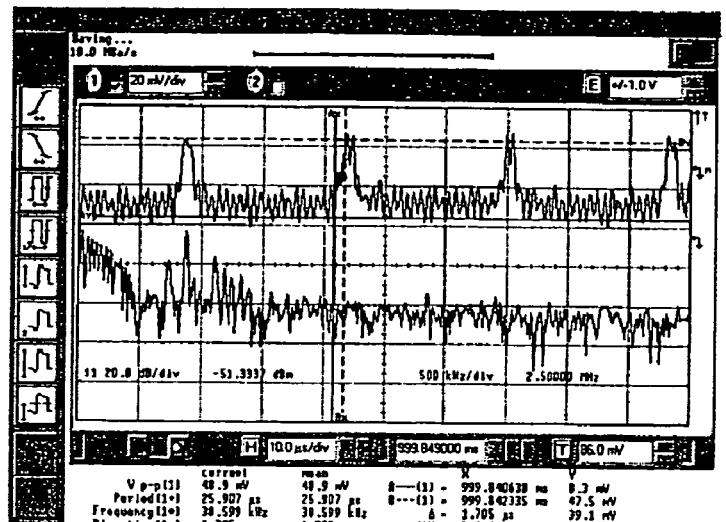
FIGS. 5A, 5B and 5C show, according to an embodiment of the present invention, a comparison of the time series and frequency-domain spectra (in high frequency domain) for an individual referred to as "a" (FIG. 5A), an individual referred to as "e" (FIG. 5B) and an individual referred to as "m" (FIG. 5C)

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

A summary of one embodiment of the present invention will now be described. In this embodiment the DREAS may permit an individual to be characterized through measurements such as a electric wave time series in two ranges: a low frequency band of about 50 to about 60 Hz and a high frequency band of about 30 to about 50 kHz. Of note, it is believed that these combined ranges are currently unused in the electrophysiology field such as the ECG generated in the heart and the EEG generated in brain.

More particularly, DREAS is not associated with the sympathetic-parasympathetic (vagal) nervous human system reflecting very low frequencies less than 1 Hz. DREAS also differs from EEG quasi-periodic brain rhythms, which typically lay only within 0.5–100 Hz. In contrast, various embodiments of DREAS relate to a brain oscillatory process resulting in high frequency electromagnetic emission of the human body (under various embodiments of the present invention electrodynamics profiling may be carried out using an oscilloscope).

Referring now to one specific embodiment of the present invention, a two-channel Tektronix 222 1A oscilloscope with input impedance 1 MΩ and 20 pF may be used to obtain the measurements. Generally, it was observed that contacting a needle-type probe to any point on the human body gives a sine-type signal with a strong modulation within low frequencies close to 60 Hz. Increased time scale shows that there is a high frequency modulation inside close to a few tens of kHz. These low frequency (i.e., 60 Hz) and high frequency (a few tens of kHz) modulations are varied in time, so the cycling period is about 7 to 10 s. The high frequency range is also varied in shape and slightly in amplitude, however it is also substantially repeatable in a cycling period. In one example (which example is intended to be illustrative and not restrictive), the signals may be obtained from finger(s).

In another embodiment, the measurements may be obtained using a two-channel Hewlett Packard infinium oscilloscope 500 MHz 1 Gsa/s with input impedance 1 MΩ and 8 pF. This device permits in-situ measurements (with mathematical treatment of results such as the electric wave measurements and FFT (spectra power)) along with the storage of data and transfer of data to an electronic device (e.g., computer). Thus, an individual profile may become available (e.g., essentially immediately) for observation and profile analysis.

Referring now to FIG. 1, it is seen that this Fig. shows a low frequency signal with a high frequency modulation. In one example (which example is intended to be illustrative and not restrictive), the amplitude of this signal may vary between about 100 and 150 mV (e.g., depending on the individual and the oscilloscope model). As shown in FIG. 1, the low frequency is close to 60 Hz (this is the basic AC electric frequency in the USA; in Europe the basic AC electric frequency will typically be close to 50 Hz). Thus, the low frequency cannot represent individual characteristics completely because the spectra energy includes only one peak without high resolution for different individuals (this is shown in FIG. 2). Of note, increasing analysis to higher medium frequencies normally gives a more distinctive picture in terms of individual rhythmic spikes (as illustrated in FIG. 3).

Referring now to FIG. 4, this Fig. shows a time series of human electric rhythmic activity (top plot) along with spectrum pattern (bottom plot) representing individual "m" in a high frequency range. As shown in this example (which example is intended to be illustrative and not restrictive), the amplitude of the signal is about 100 mV and the period of high frequency oscillatory spikes is about 27 $\mu$s (about 37 kHz). Of note, the shape of such spikes is very distinctive and they have a transitional cycle that also varies from individual to individual (e.g., from about 5 to 10 s). Moreover, the spectrum pattern gives very complete information about an individual's rhythmic activity (i.e., the frequency positioning and spike amplitudes in spectrum permit the identification of the individual's unique characteristics).

Figure 5B:
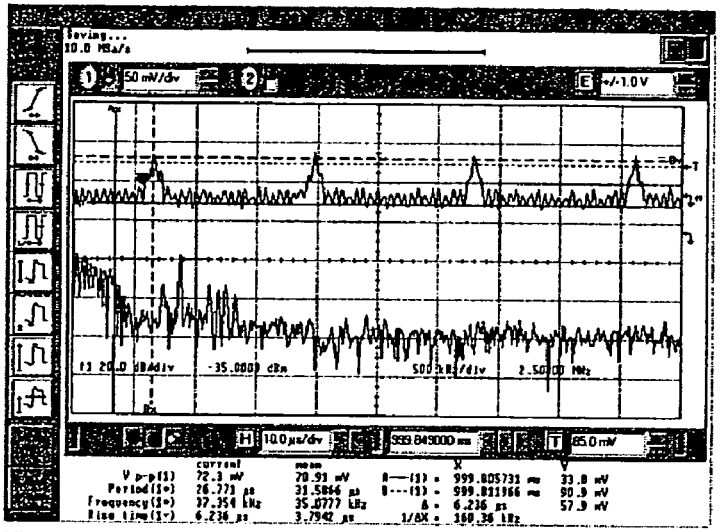
Figure 5C:
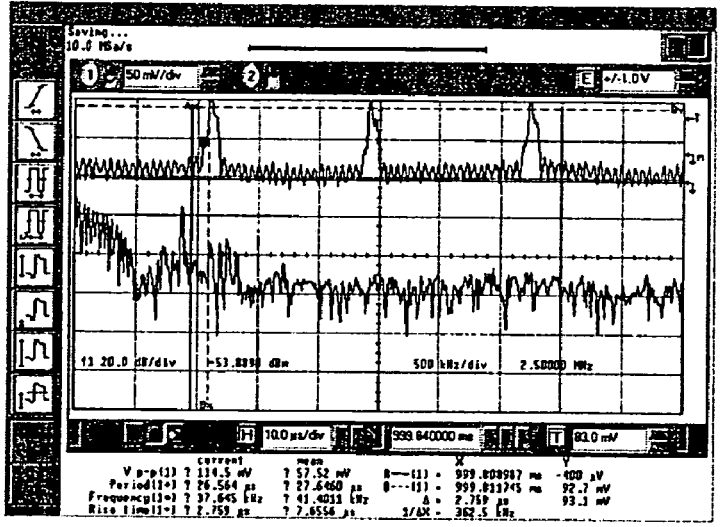

Referring now to FIGS. 5A, 5B and 5C a comparison of the time series and frequency-domain spectra (in high frequency) for an individual referred to as "a" (FIG. 5A), an individual referred to as "e" (FIG. 5B) and an individual referred to as "m" (FIG. 5C) are shown. As seen in these Figs., there are at least four clear differences between individuals:

In the time series one can see different shapes of the high frequency spikes. There are also differences in term of signal-to-noise ratio.

In the frequency-domain the low frequency (up to about 500 kHz) has different wrapping oscillation.

In the frequency-domain the high frequency (between about 500 KHz and about 1.5 MHz) has individual spikes in spectra with a unique pattern for a particular individual.

In the frequency-domain the higher frequencies (over about 1.5 MHz) are very noisy (and, in this embodiment, cannot readily be used for quantitative spectra analysis).

Figure 6A:
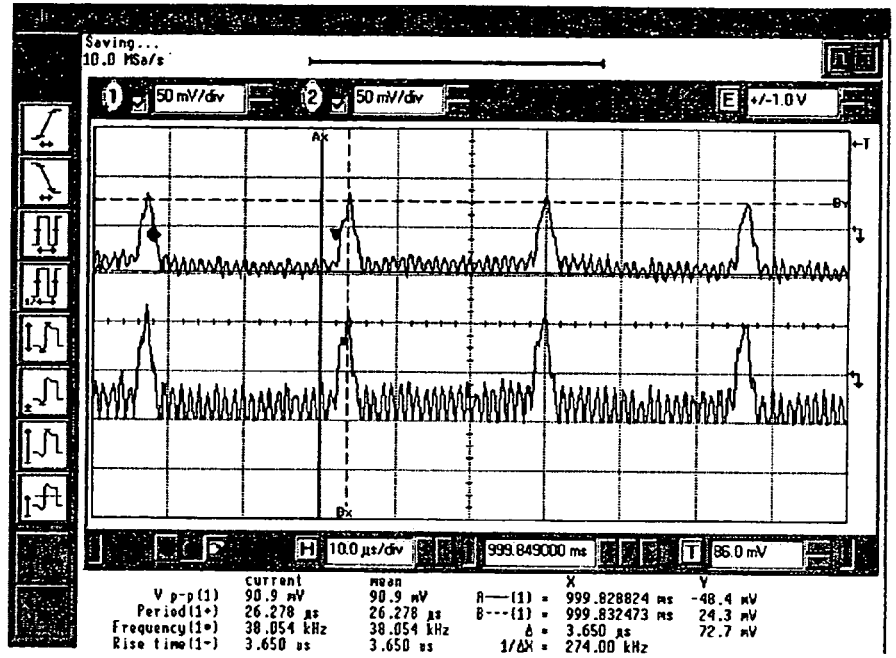
FIG. 6A shows simultaneous measurements on the right hand and left hand index fingers of an individual referred to as "m" according to an embodiment of the present invention.
Figure 6B:
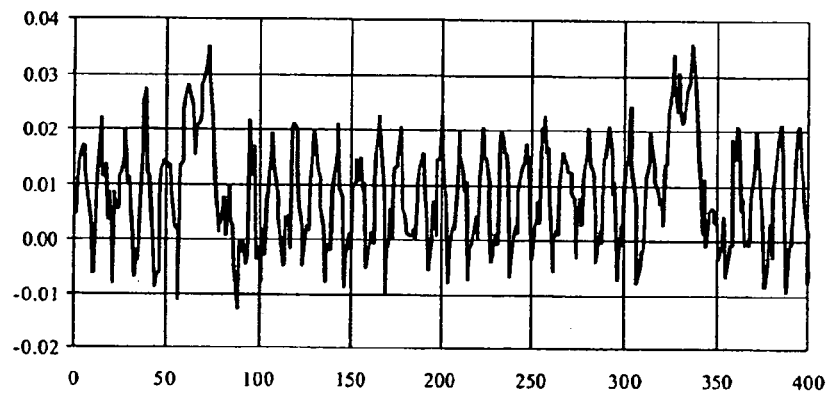
FIG. 6B shows differential output for the first two spikes of FIG. 6A.

Of note, signals from body contacting points around the body are well phased (the high frequency spikes may be slightly varied from one body point to another). As seen in FIGS. 6A and 6B, it is believed that the right hand finger generally gives a stronger signal than the left hand finger (the top plot of FIG. 6A shows a time series relating to the left hand index finger and the bottom plot of FIG. 6A shows a time series relating to the right hand index finger). As indicated in this example (which example is intended to be illustrative and not restrictive), the right finger emits a signal over 100 mV while the left finger generates only about 80 mV. The differential output shown in FIG. 6B has additional information about personality and its rhythmic activity.

In another embodiment, human electrophysiologic and/or rhythmic activity may be quantitatively characterized and/or individualized by means of measurement of an electric signal (e.g., in the frequency-domain in connection with low frequency up to about 500 kHz and high frequency up to about 1.5 MHz).

In another embodiment, identification of an individual may be carried out using a two-channel oscilloscope (e.g., with resolution higher than 100 MHz and sensitivity better than 50 mV/div). Such a two-channel oscilloscope may be used for electric measurement from two different body points on an individual simultaneously (in one example (which example is intended to be illustrative and not restrictive), a needle-type probe may be used for sensing the rhythmic signal). An example of two points giving good signal-to-noise ratio (which example is intended to be illustrative and not restrictive) are index fingers on the left and right hands. In this case, strength of signal in time series obtained on different individuals may vary, for example, within about 40 to 150 mV and the basic oscillation frequency in a high frequency range may vary, for example, from about 30 to 50 kHz. Further, in spectra analysis characteristic spikes (energy peaks) may lay, for example, within about 0.5 to 1.5 MHz.

In another embodiment, a unique signal obtained from two (or more) fingers (and/or other body point(s)) can be used in time series and spectrum analysis to yield more precise individual characteristics.

In another embodiment, characteristics may be obtained by means of dynamic monitoring of the rhythmic activity over a period of time (for example (which example is intended to be illustrative and not restrictive), over a period of 5 to 10 s).

In another embodiment, measured data may be stored (e.g., as a DREAS transmittable file) on an electronic device (such as a computer, for example).

In another embodiment, an oscilloscope with probe(s) and/or other electronic device(s) may be integrally constructed as a portable unit. In one example (which example is intended to be illustrative and not restrictive), the device may utilize a band filter (e.g., of about 0.5–1.5 MHz) at the signal-input port.

In another embodiment, the present invention may permit the recordation of an individual's profile dynamically (which profile may be unique to each individual (e.g., in terms of time series and/or energy spectra)). Generally, once such dynamic pattern is obtained by the present invention via means of electric wave time series, a particular individual may be identified precisely (e.g., after a measurement lasting about 10 seconds, for example).

In another embodiment, the present invention may provide for the use of the high frequency domain of the spectra to effectively identify and/or diagnose brain disease (such as Alzheimer or Parkinson disease, for example).

As discussed above, one aspect of the present invention provides a method for measuring human rhythmic electric activity as a dynamic time series (e.g., in low and high frequency ranges) using an oscilloscope and FFT spectra analysis to obtain an individual's unique pattern. This pattern can be reproduced (e.g., at any time) from the same individual by the same measurements and used for identification of the person. For example, because of the durability, reliability, affordability and simplicity of the measurements generated by the present invention, this invention may be widely implemented in various fields of U.S. Homeland Security (as well as in the private sector where the identification of a physiological pattern is needed (e.g., to proceed on security measures)). Some of the benefits of this application deal with its measurement simplicity and cheapness. It is believed that DREAS gives a unique dynamic characteristic of an individual that cannot be forged or changed during an individual's lifetime. Thus, once the reference data are stored and filed, such data may be used for identification purposes (and/or as a monitoring of brain normal or abnormal activity).

In another embodiment, the present invention may be implemented by medical centers (e.g., hospitals) and/or recreation facilities for diagnosing and/or treating patients with a variety of brain diseases. In this case, the time series and/or frequency-domain profile (e.g., in high frequency) may indicate even a small destruction of brain activity that can be used as a powerful "calibration" source for treatment and/or recreation processes.

In another embodiment, the measured time series may be transferred into spectrum energy using FFT both in low (e.g., about 50–60 Hz) and high (e.g., about 30–50 kHz) frequency ranges. The time series and/or spectrum energy (i.e., the FFT'ed data) may be recorded over a characteristic individual period (e.g., about 5–10 seconds). The profile generated may then be saved or stored in an appropriate means for future reference for identification. In this regard, to identify an individual whose profile had been saved or stored, the measurements may be repeated using similar hardware/software in static, frame-by-frame, and/or dynamic forms (in connection with medical diagnosis/treatment, the time series and/or frequency-domain data (e.g., high frequency) may be analyzed and used for appropriate diagnosis/treatment).

In another embodiment, the present invention may be applied to the task of differentiating individuals for a variety of purposes, including (but not limited to): (a) medical tests; (b) homeland security tracking/profiling; and/or (c) tracking/profiling of unlawful persons (e.g., fugitives).

In another embodiment, the simplicity (in terms, for example, of test procedure) and cost effectiveness of the present invention may make it available for in-situ monitoring at certain critical public places. Such critical public places may include, but not be limited to: (a) borders (e.g., international borders); and/or (b) terminals (e.g., international airports and/or port terminals).

In another embodiment, the present invention may be integrated with official data records (e.g., INS data records). Such integration may be carried out, for example, via the Internet and/or any other desired communication medium.

In another embodiment, the present invention may be used for broad diagnostic investigations at the early stage of various diseases (e.g., those diseases associated with the human brain).

In another embodiment, measurements may be carried out under a conditioned signal input of 1 MΩ and 20 pF along with one or more needle-type probe(s) of 10 MΩ and 12 pF. The probe(s) may be applied to any point(s) on the body (e.g., the arms, the head and/or the fingers on the hand). In another example (which example is intended to be illustrative and not restrictive), time series measurements with time-amplitude resolution setup of about 5 ms/div–0.1 V/div in low frequency range and 5 μs/div–20 mV/div in high frequency range can be obtained in a few seconds as a dynamic record (because of the appearance of a long time cycling of the pattern during about 10 sec.).

In another example (which example is intended to be illustrative and not restrictive), the following lists four different types of measurements that have been carried out with the present invention: (a) low frequency domain analysis; (b) high frequency domain analysis; (c) on different fingers of an individual; and (d) on different individuals.

As shown, various embodiments of the present invention disclose features of an affordable system for any security agency to accurately identify individuals and/or for any medical provider to perform brain condition diagnosis/treatment. In one embodiment, the present invention may be implemented simply with an oscilloscope or spectra analyzer within a 100 MHz frequency band and a personal computer and/or electronic device to compare and contrast the reference profiles stored and the one being analyzed on-site. The measurement of dynamic time series can be performed fast and yield results with regards to an individual's identification or brain disease diagnosis within a brief period of time. In one example (which example is intended to be illustrative and not restrictive), it may take not longer than about 10 seconds with parallel processing of data in FFT format to get a spectrum analysis. Such analysis reflects very individual characteristic "energy-frequency" domains with regard to a particular individual (e.g., a person seeking entry into the country or a medical patient).

Of note, the invention described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may be "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the measurements may be taken at any desired point(s) on the individual's body. Further still, all equipment models and specifications discussed herein are provided as examples only, and are intended to be illustrative and not restrictive. Further still, all of the plots disclosed herein are, of course, intended to be illustrative and not restrictive. Further still, the electrical signal(s) may be measured in a non-contact manner (e.g., via one or more antennas that receives electromagnetic radiation from the body). Further still, the various steps may be performed in any desired order.

What is claimed is:

1. A method for distinguishing an individual, comprising:
    contacting the individual with an electrical probe;
    measuring, with the electrical probe, an electrical signal associated with the individual;
    processing the electrical signal to produce a time-series representation of the electrical signal and a frequency-domain representation of the electrical signal;
    identifying a distinct pattern in the time-series representation in a range of about 30 kHz to about 50 kHz; and
    identifying a distinct pattern in the frequency-domain representation in a range of about 500 kHz to about 1.5 MHz.

* * * * *